(12) United States Patent
Salour

(10) Patent No.: US 10,027,624 B1
(45) Date of Patent: Jul. 17, 2018

(54) REGION-BASED REDIRECTION AND BRIDGING OF CALLS

(71) Applicant: 8×8, Inc., San Jose, CA (US)

(72) Inventor: Mehdi Salour, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 36 days.

(21) Appl. No.: 15/337,545

(22) Filed: Oct. 28, 2016

(51) Int. Cl.
*H04L 29/12* (2006.01)
*H04M 7/00* (2006.01)
*H04L 29/08* (2006.01)
*H04L 12/64* (2006.01)

(52) U.S. Cl.
CPC ............ *H04L 61/256* (2013.01); *H04L 12/64* (2013.01); *H04L 61/2007* (2013.01); *H04L 67/18* (2013.01); *H04M 7/006* (2013.01)

(58) Field of Classification Search
None
See application file for complete search history.

(56) References Cited

U.S. PATENT DOCUMENTS

| | | | | |
|---|---|---|---|---|
| 6,456,625 | B1 * | 9/2002 | Itoi | H04L 29/12009 370/401 |
| 6,772,210 | B1 * | 8/2004 | Edholm | H04L 29/06027 370/352 |
| 7,403,604 | B2 | 7/2008 | Mundra et al. | |
| 7,711,094 | B1 * | 5/2010 | Olshansky | H04M 7/006 370/352 |
| 8,064,909 | B2 | 11/2011 | Spinelli et al. | |
| 8,918,867 | B1 | 12/2014 | Salour | |
| 8,948,358 | B1 | 2/2015 | Rengarajan et al. | |
| 9,294,433 | B1 | 3/2016 | Salour | |
| 9,426,116 | B1 | 8/2016 | Salour | |
| 2003/0093563 | A1 * | 5/2003 | Young | H04L 12/4633 709/245 |
| 2004/0218748 | A1 * | 11/2004 | Fisher | H04L 12/66 379/221.01 |
| 2006/0193308 | A1 * | 8/2006 | Sung | H04L 29/06027 370/352 |
| 2007/0047571 | A1 | 3/2007 | Kandikonda et al. | |
| 2007/0091800 | A1 | 4/2007 | Corcoran | |
| 2007/0115942 | A1 | 5/2007 | Money et al. | |
| 2008/0125077 | A1 | 5/2008 | Velazquez et al. | |
| 2009/0201916 | A1 | 8/2009 | Caron et al. | |

(Continued)

FOREIGN PATENT DOCUMENTS

WO WO0135579 A1 5/2001

*Primary Examiner* — Steven H Nguyen
(74) *Attorney, Agent, or Firm* — Crawford Maunu PLLC

(57) ABSTRACT

Apparatus and methods are disclosed for bridging communications between a private network and a public network. A mapping that associates a first set of IP addresses of endpoints in the private network with a second set of IP addresses of endpoints in the public network is provided which enables communications between the private network and public network for network-address-translation (NAT). In response to a data packet having a first IP address of the first set of IP addresses, the data packet is used to determine whether the local line should be accessed. In response to an indication that the local line should be accessed, the identifier among the second set of IP addresses is used to activate an analog-telephone bridging (ATB) circuit and redirect a call associated with the data packet by passing the data packet through the ATB circuit.

21 Claims, 5 Drawing Sheets

(56) References Cited

U.S. PATENT DOCUMENTS

2010/0128709 A1     5/2010   Liu et al.
2011/0170681 A1     7/2011   Kole et al.
2017/0070540 A1*   3/2017   Combellas .......... H04L 65/1066

* cited by examiner

REGION-BASED REDIRECTION AND BRIDGING OF CALLS

OVERVIEW SUMMARY

The instant disclosure relates generally to communication systems and, more particularly to communication between endpoint devices wide-area-networks (WANs), such as the internet and local area networks (LANs). For ease of reference, endpoint devices are sometimes referred to simply as an "endpoints" and where they are configured with VoIP capability, they are sometimes referred to as a "VoIP endpoint." Each such endpoint or endpoint device refers to or includes communications circuitry with programming/configuration data specific to the communications protocol(s) for which the endpoint device is enabled. In many contexts, endpoints and VoIP endpoints (which are VoIP-capable) are telephones commonly used and referred to as IP phones such as used on desktops, mobile (smart) phones, desktop CPU stations, laptops, tablets and the like. For ease of reference, a WAN may be referred to as a public network and a LAN may be referred to as a private network. IP addresses used for identification of endpoint devices in the public network may be referred to as public IP addresses and IP addresses used for identification of endpoint devices in the private network may be referred to as private IP addresses. Public IP addresses are issued by a central authority known as the Internet Assigned Number Authority ("IANA").

Due to the limited number of the currently used IPv4 type IP addresses, in many communications environments there are insufficient public IP addresses to identify all endpoints uniquely in a private network. This issue is addressed in part by network address translation ("NAT") as currently used in many networks to allow multiple endpoints in a private network to be identified on a public network using the same public IP address. In this regard, the multiple endpoints of the private network communicate data via a single public IP address. For each connection initiated by an endpoint, a NAT pathway is created and maintained by a NAT circuit for a limited period of time. The NAT pathway maps a private IP address and port of the device to an exclusive port of the public IP address. By mapping devices to different virtual ports of the public IP address, multiple endpoints may be uniquely identified by the port:IP address combination—thereby allowing the endpoints in a private network to communicate on the public network using the same public IP address.

Certain portions of the instant disclosure more particularly relate to telephone services as used in the communications industry. The communications industry continues to rely upon advances in technology to realize higher-functioning systems at cost-effective prices. Telephony signals can now be transmitted by methods and systems including traditional public standard telephone networks (PSTNs), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few.

Various example embodiments are directed to issues such as those addressed above and/or others which may become apparent from the following disclosure concerning communications systems involving, for example, VoIP-enabled endpoint devices and/or the use of network address translation (NAT) in communications systems.

Certain exemplary aspects of the instant disclosure are directed to embodiments used in systems which convert or translate addresses of endpoint devices for effective communications within a larger communications network or set of networks. For example, specific embodiments are directed to methods for communicating between endpoints in a private network and in a public network. In these embodiments, the endpoints in the private network have or are associated with a first set of respective IP addresses which are accessed and/or controlled remotely by a communications server configured to provide communications/media services such as the VoIP-type communications noted above. The endpoints in the public network are associated with a second set of IP addresses. At least one processing circuit connected to the private network and the public network facilitates the communications by providing an assigned mapping through which the first set of respective IP addresses in the private network is associated with the second set of IP addresses. Although not required, the communications between the private network and public network can be enabled for network-address-translation (NAT) in communications by the endpoints in one or more geographic region(s) via the assigned mapping. For example, the assigned mapping includes identification of a local line having an identifier among the second set of respective IP addresses. In response to a data packet received at a first port of a telecommunications-providing server, and having a first IP address of the first set of IP addresses (e.g., to ID an endpoint in the private network), the data packet is used to determine whether the endpoint identified by the first IP address indicates that the local line should be accessed and may also be used to determine in which of the geographic regions the endpoint identified by the first IP address is located.

In response to the endpoint identified by the first IP address indicating that the local line should be accessed, the identifier among the second set of respective IP addresses is used to cause control data to be sent for activating an analog-telephone bridging circuit, and therefrom redirecting a call associated with the data packet received at the first port (of the telecommunications-providing server) by obtaining dial tone and passing at least a subset of the data packet through the analog-telephone bridging circuit for connecting over the local line. In response to the endpoint identified by the first IP address indicating a second IP address of the first set of IP addresses, such as to ID another endpoint in the private network, the method includes using another identifier among the second set of respective IP addresses to cause a call associated with the data packet received at the first port of the telecommunications-providing server to be bridged for communications between the endpoint identified by the first IP address and an endpoint associated with the second IP address of the first set of IP addresses.

In certain embodiments, NAT is performed for data packets communicated between a public network and a private network having endpoints located in a plurality of defined geographic regions. NAT is performed using different sets of public IP addresses for different geographic regions of a private network. In response to a data packet from a first port of a private IP address, used to identify an endpoint in the private network, a geographic region of the private network that includes an endpoint identified by the private IP address is determined. A public IP address is selected from a set of public IP addresses that is mapped to the determined geographic region in the database. An available port of the selected public IP address is assigned for NAT. NAT is performed for data communicated between the public and private networks using a mapping of the first port of the first IP address to the second port of the second IP address.

In other example embodiments, an apparatus is configured to perform NAT for data packets communicated between a public network and a private network having a plurality of defined geographic regions. The apparatus includes a first network interface circuit configured to communicate data over the private network using a first set of IP addresses to identify endpoints, the endpoints being located in a plurality of geographic regions. The apparatus also includes a second network interface configured to communicate data over the public network using a second set of IP addresses to identify the endpoints. A NAT processing circuit is coupled to the first and second interfaces and configured to perform NAT, using respective subsets of the second set of IP addresses specified for the plurality of geographic regions in a database. In response to a data packet from a first port of a first private IP of the first set of private IP addresses, the NAT processing circuit optionally determines in which of the plurality of geographic regions the endpoint identified by the first private IP address is located. The NAT processing circuit selects a second IP address from a subset of the second set of IP addresses specified for the determined geographic region in the database. The NAT processing circuit assigns an available second port of the selected IP address for NAT. The NAT processing circuit performs NAT for data communicated between the public and private networks using a mapping of the first port of the first IP address to the second port of the second IP address.

Although the above describes use of NAT for communication systems, various embodiments do not include the use of NAT. For example, in various embodiments, at least one processing circuit connected to the private network and the public network performs the communication therebetween by providing an assigned mapping through which the first set of respective IP addresses in the private network is associated with geographic locations of the respective endpoints. In some specific aspects, the assigned mapping includes identification of a local line, which can have an identifier among the second set of respective IP addresses associated with the public network. In response to a data packet received at a first port of a telecommunications-providing server and having a first IP address of the first set of IP addresses, the data packet is used to determine a geographic location that the endpoint identified by the first IP address is located and whether the endpoint identified by the first IP address indicates that the local line should be accessed. In response to an indication that the local line should be accessed, the identification of the local line (e.g., an identifier among the second set of respective IP addresses) is used to cause control data to be sent for activating an analog-telephone bridging circuit, and therefrom redirecting a call associated with the data packet received at the first port by obtaining dial tone and passing at least a subset of the data packet through the analog-telephone bridging circuit for connecting over the local line. In response to the endpoint identified by the first IP address indicating a second IP address of the first set of IP addresses, such as to ID another endpoint in the private network, the method includes using another identifier among the second set of respective IP addresses to cause a call associated with the data packet received at the first port of the telecommunications-providing server to be bridged for communications between the endpoint identified by the first IP address and an endpoint associated with the second IP address of the first set of IP addresses.

In yet other embodiments, the above-characterized telecommunications-providing server can be part of a VoIP PRI gateway (for connectivity between legacy PRI and SIP-based VoIP telephony) that uses a variable extension protocol to enable direct routing of calls between endpoints via the private and the public network. Such routing includes direct routing of calls to endpoints communicatively tied to one or more local lines (e.g., land or fixed lines). In response to receiving a data packet at the telecommunications-providing server, the data packet directs the server on how to determine a geographic region in which the endpoint is located or for how the region may be associated with the endpoint through a configuration set up through a related private network. Further, through such a private-network configuration, the server determines whether a local line should be accessed for the requested call. For example, the data packet can include an extension that identifies the other endpoint and/or corresponds to information for connecting over the local line through the ATB circuit, and the server uses a variable extension protocol to interpret whether the data packet received at the first port either corresponds to an extension identifying another endpoint in the private network or in the public network and/or optionally, to interpret and identify which of a plurality of different extensions in a branch office (e.g., in a particular a geographic region) is targeted by the data packet at the first port.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
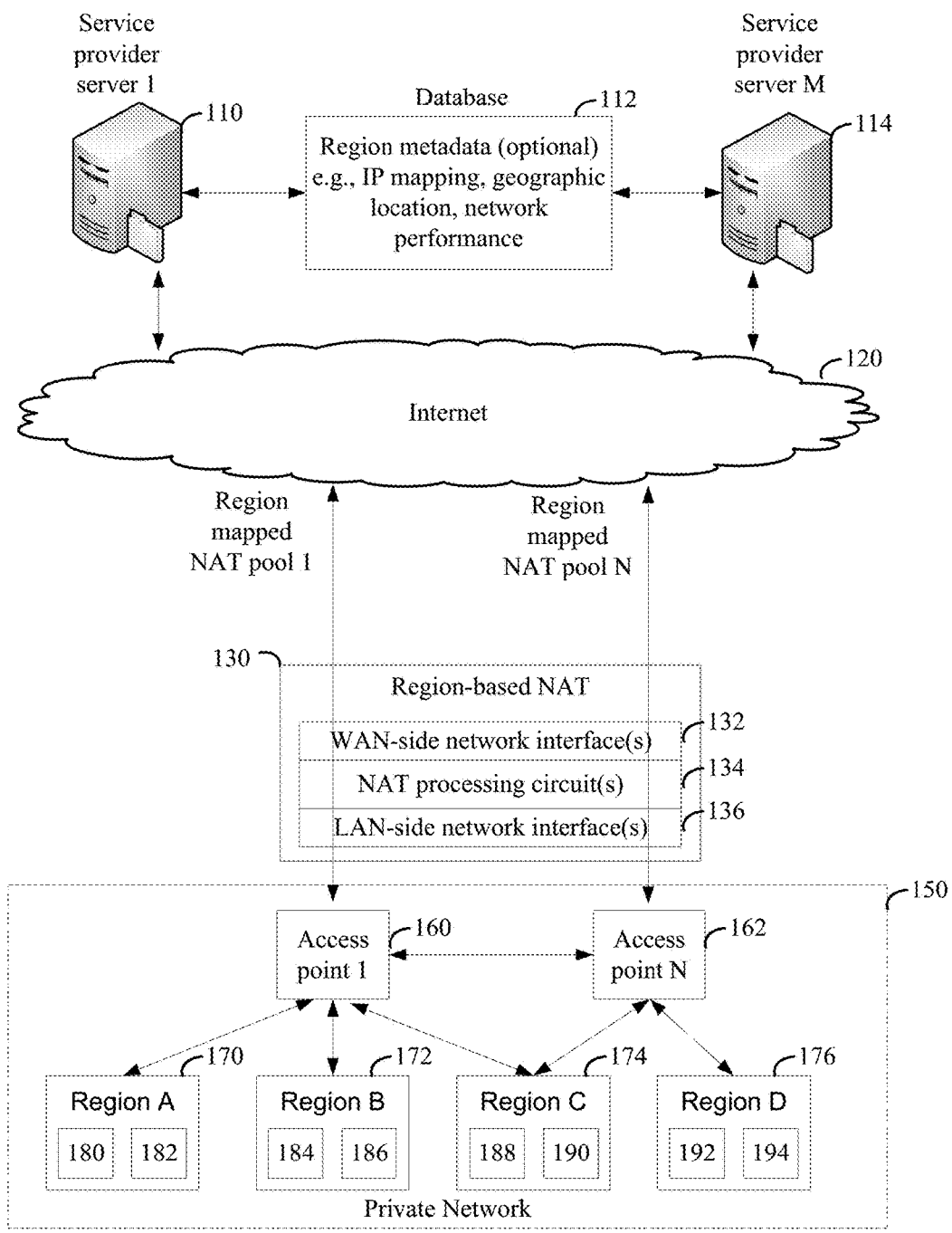
FIGS. 1A-1B show examples of communication networks, configured in accordance with one or more embodiments of the instant disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, including systems and/or devices, and methods involving redirection and bridging calls between a private network and a public network. Some example implementations are directed to apparatuses and methods for performing IP-address mapping (such as NAT) for data communicated between a public network and a private network having endpoints located in a plurality of defined geographic regions using an analog-telephone bridging (ATB) circuit connected to one or more local (or fixed) lines. While not necessarily so limited, various aspects may be appreciated through the following discussion of non-limiting examples which use exemplary contexts.

Accordingly, in the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element, and various embodiments are described without any specific reference to the illustrations disclosed herein. Also, although aspects and features may in some cases be described in individual figures, it will be appreciated that features from one figure (or characterized embodiment(s)) can be combined with features of another figure or embodiment even though the combination is not explicitly shown or explicitly described as a combination.

In certain more specific embodiments, a network device communicates data packets between a public network and a private network using an ATB circuit to connect to one or more local lines. The ATB circuit can connect endpoints in the private network to the public network by redirecting a VoIP call to the public network. The ATB circuit utilizes one or more local lines connected to it and redirects a call to the public network, such as an emergency service provider and/or endpoints that are not part of the private network (e.g., local or toll free telephone numbers). Control data can be provided to the ATB circuit to cause the ATB circuit to activate and connect to the local line. The ATB circuit can connect to one local line, such as a dedicated local land line, or to any of a plurality of land lines, and can bridge a call from an endpoint of the private network to the public network using the local line.

In other specific embodiments, the endpoints in the private network and endpoints in the public network are respectively associated with different sets of IP addresses. For example, the endpoints in the private network have a first set of respective IP addresses and the endpoints in the public network have a second set of IP addresses. A processing circuit connected to the private network and the public network performs the communication by providing an assigned mapping through which the first set of respective IP addresses in the private network is associated with the second set of IP addresses. The communications between the private network and public network are enabled for NAT'd communications by the endpoints in one or more geographic regions via the mapping. For example, the assigned mapping includes identification of a local line, which is connected to an ATB circuit associated with the respective geographic region. The local line has an identifier among the second set of respective IP addresses.

Specific systems such as the types described above can be used to direct telecommunication calls via data packets received by a telecommunications-providing server (e.g., configured as VoIP service provider), thereby conveying the data packets from an endpoint within the private network.

In certain exemplary embodiments, the telecommunications-providing server can be part of a VoIP PRI gateway that uses a variable extension protocol to enable direct routing of calls between endpoints via the private and the public network. In response to a data packet received at a first port of a telecommunications-providing server, the data packet is used by the telecommunications-providing server to determine a geographic region in which the endpoint is located. Further, the data packet is used to determine whether a local line should be accessed for the requested call. The data packet received by the server can include data identifying the other endpoint that the endpoint is attempting to call. For example, the data packet can include an extension that identifies the other endpoint or corresponds to information for connecting over the local line through the ATB circuit. For this type of embodiment in which a variable extension is used, the telecommunications-providing server uses a variable extension protocol to interpret whether the data packet received at the first port either corresponds to an extension identifying another endpoint in the private network or in the public network. Alternatively and/or in addition, the variable extension protocol can be used to interpret and identify which of a plurality of different extensions in a branch office (e.g., a geographic region) is targeted by the data packet at the first port.

In response to the endpoint identified by the first IP address indicating that the local line should be accessed, the ATB circuit is activated by providing control data (e.g., derived from control data sent by the telecommunications-providing server and/or a related server in the determined geographic region) to the ATB circuit. The indication that the local line should be accessed can include the call number for the VoIP call including an emergency provider number (e.g., 911) and/or a digit indicating a local telephone number or toll free-number (e.g., an "8" before the telephone number of seven digits, ten digits, or eleven digits). In specific embodiments, the ATB circuit can redirect and connect to an emergency service provider which is specific to the geographic region and assigned for emergency calls of certain type and that are initiated on behalf of the private network.

The ATB circuit can be activated by the control data. For example, the telecommunications-providing server and/or the region-based NAT circuit can send the control data to the ATB circuit using the identifier among the second set of respective IP addresses. In various specific embodiments, the region-based NAT circuit is used to replace the first IP address in a source address of the received data packet with the second IP address to produce a NAT'd data packet. The NAT'd data packet is used as information (such as the control data or a portion thereof), for connecting over the local line through the ATB circuit. The ATB circuit responds to the control data by connecting to the local line, such as a local dedicated line and/or a PRI line. In response to the activation, the call associated with the data packet received at the first port (of the telecommunications-providing server) is redirected to the public network by obtaining a dial tone and passing at least a subset of the data packet through the ATB circuit.

In response to the endpoint identified by the first IP address indicating a second IP address of the first set of IP addresses (e.g., identifying another endpoint in the private network), another identifier among the second set of respective IP addresses is used to cause a call associated with the data packet received at the first port of the telecommunications-providing server to be bridged for communications between the endpoint identified by the first IP address and an endpoint associated with the second IP address of the first set of IP addresses.

In various specific embodiments, an endpoint that is part of the local branch can utilize the ATB circuit from a variety of geographic locations to connect to another endpoint that is part of a public network. For example, one or more endpoints of the private network can include, in addition to IP phones enabled for VoIP, cellphones and/or other mobile devices. Regardless of the region in which the endpoint is located, the user can connect to another endpoint within the public network via the ATB circuit.

While the above discussion refers to use of NAT for communicating within network, embodiments in accordance with the present disclosure do not necessarily require use of region-based NAT. For example, in various embodiments, the assigned mapping includes identification of a local line, which can have an identifier among the second set of respective IP addresses associated with the public network. In response to a data packet received at a first port of a telecommunications-providing server and having a first IP address of the first set of IP addresses, the data packet is used to determine a geographic location that the endpoint identified by the first IP address is located and whether the endpoint identified by the first IP address indicates that the local line should be accessed. In response to an indication that the local line should be accessed, the identification of the local line (e.g., an identifier among the second set of respective IP addresses) is used to cause control data to be sent for activating an analog-telephone bridging circuit, and therefrom redirecting a call associated with the data packet received at the first port by obtaining dial tone and passing at least a subset of the data packet through the analog-telephone bridging circuit for connecting over the local line. In response to the endpoint identified by the first IP address indicating a second IP address of the first set of IP addresses, such as to ID another endpoint in the private network, the method includes using another identifier among the second set of respective IP addresses to cause a call associated with the data packet received at the first port of the telecommunications-providing server to be bridged for communications between the endpoint identified by the first IP address and an endpoint associated with the second IP address of the first set of IP addresses.

In accordance with many embodiments, a network device is configured to communicate data packets between a public network and a private network using a region-based NAT. In response to a data packet from a first port of a private IP address, used to identify an endpoint in the private network, a geographic region of the private network that includes an endpoint identified by the private IP address is determined. A public IP address is selected from a set of public IP addresses that is mapped to the determined geographic region in the database. An available port of the selected public IP address is assigned for NAT. NAT is performed for data communicated between the public and private networks using a mapping of the first port of the first IP address to the second port of the second IP address.

Different embodiments may utilize various circuit arrangements to perform region-based NAT. In certain embodiments, a region-based NAT circuit includes a first network interface circuit configured to communicate data over the private network using a set of private IP addresses to identify endpoints in the private network. The region-based NAT circuit also includes a second network interface configured to communicate data over the public network using a set of public IP addresses to identify the endpoints.

A NAT processing circuit coupled to the first and second interfaces is configured to perform the region-based NAT using respective subsets of the set of public IP addresses specified for each of the geographic regions in a database.

The processing circuit may perform region-based NAT using various processes. As an illustrative example, the NAT processing circuit may perform region-based NAT by performing operations including:
1) in response to a data packet from a first port of one of the private IPs, determining which of the plurality of geographic regions the endpoint identified by the first private IP address is located;
2) selecting a second IP address from a subset of the second set of IP addresses specified for the determined geographic region in the database;
3) assigning an available second port of the selected IP address for NAT; and
4) performing NAT for data communicated between the public and private networks using a mapping of the first port of the first IP address to the second port of the second IP address.

In some embodiments, the region-based NAT circuit may include additional circuits configured to perform one or more of the above operations. For example, in some embodiments, the region-based NAT circuit may include a region determination circuit configured to determine the geographic region-based on the private source IP address indicated in the data packet. The geographic region may be determined, for example, by looking up the geographic region in a stored table mapping the private IP addresses to the geographic regions. As another example, the region-based NAT circuit may include a mapping circuit configured to determine the subset of public IP addresses to be used for NAT for the determined region. The mapping circuit may determine the subset of public IP addresses, for example, by retrieving the subset of public IP addresses from a database mapping the public IP addresses to the geographic regions in the private network.

In certain embodiments, region-based NAT is used to facilitate location-based routing of data in private networks. In location-based routing, the resources (e.g., network paths and/or data servers) used to provide service to endpoints may be adjusted based on the geographic location of the endpoints. Location-based routing may be used, for example, reducing latency, enhancing quality, and/or improving efficiency in many network applications. Additionally or alternatively location-based routing may be used to enhance security for network communication. For instance, due to political, security, or compliance concerns, the traffic from a specific geographic region might need to be handled in a certain way (through a particular route/data center, etc.).

In a public network, geolocation of an endpoint can be obtained, for example, based on a public IP of the endpoint from IP registration data, IP geolocation services, or various other sources that correlate an IP address with a geolocation. However, it can be difficult to distinguish and determine location of endpoints in a private network after NAT has converted private IP addresses to one or more shared public IP addresses. One or more embodiments utilize region-based routing to facilitate location-based routing in private networks. Region-based NAT allows the geographic location of endpoints in the private network to be identified at a region level based on the public IP used for NAT and communication via the public network. Since region-based routing performs NAT using a different subset of public IPs for each geographic region, a public network device (e.g., a server)

may determine the geographic region of a private network endpoint based on the public IP used to identify the endpoint on the public network. The geographic region may be determined from the public IP using, for example, a database that maps each geographic region to the public IPs used for NAT. The IP to geographic region mapping data may be stored in a local database (e.g., in a memory of the public network device) and/or may be stored in a remote database communicatively connected to the device (e.g., via the public network).

After determining the geographic region of the endpoint, a public network server may select resources to provide service to the endpoint based on the determined geographic region. For example, a server may select the network paths for communicating data to the endpoint based on the geographic location of the server and the geographic region of the endpoint. In different implementations, a server may cause data to be routed over the select path using various processes. In some implementations, the server may control routing of data by selecting from a plurality of internet service providers to communicate the data over the public network. Additionally or alternatively, the server may control routing by prepending routing table entries provided to routing nodes connected to the server in the public network. Prepending may cause a routing node to believe a connection between the node and the server includes a larger number of network hops than the actual number of hops. By prepending entries provided to certain routing nodes, data paths used to route data from the endpoint to the server can be manipulated. Conversely, in some embodiments, the server may cause an access point or other device in the private network to prepend routing table entries to manipulate data paths used for routing data from the server to the endpoint.

Additionally or alternatively, in some embodiments, server(s) to be used to provide service for an endpoint may be selected based on the determined geographic region. For instance, a service provider may have multiple servers geographically distributed in a public network for providing service to endpoints. When a service request is received, one of the servers may be selected to provide service to the endpoint based on the determined geographic region of the connected endpoint. For instance, connection requests may initially be received by a load distribution server configured to assign one of the servers to provide the respective service based on the geographic region. In some embodiments, the load distribution server directs the selected server to respond to the service request and provide the requested service to the endpoint. Additionally or alternatively, the load distribution server may direct the requesting endpoint to contact the selected server for service.

The load-distribution server may be incorporated into various devices on the public network. In some embodiments, the load-distribution server may be incorporated with one or more of the servers available for selection. For example, each server may be configured to select one of the servers, based on geographic region, in response to receiving a service request from an endpoint. If the server selects itself, the server communicates with the endpoint to provide the requested service. Otherwise, the server directs the selected server and/or endpoint to cause the selected server to provide the requested service for the endpoint. As another example, in some embodiments, the load-distribution server may be implemented by domain name server (DNS) in the public network. For example, the DNS may be configured to direct an endpoint to contact different ones of the servers by controlling the IP address(es) that is provided in response to a domain name query. In some embodiments, the load-distribution server may select a subset of the servers based on the determined geographic region and direct the endpoint to select and contact a server of the subset for service. The endpoint may select a server from the subset, pseudo randomly, based on weightings provided by the load-distribution server, and/or based on various other criteria (e.g., network performance, available access points, and/or user preferences).

In some embodiments, selection of resources for providing the requested service to the endpoint may additionally or alternatively select one or more nodes in the private network, for communicating data with the endpoint, based on the determined geographic region. For example, endpoints in a particular region of a private network may be able to connect to the public network via multiple access points. For instance, a private network may be connected to the internet by access points for multiple types of connections (e.g., DSL, cable, fiber, and/or satellite) and/or by multiple internet service providers. The access point used for communication between the server and the endpoint may be selected based on various parameters in addition to or in lieu of the geographic region of the endpoint including, for example, geographic location of the endpoint and/or server, transmission characteristics of connections between the access point and the endpoint and/or server (e.g., bandwidth, latency, dropped data packets, BER, and/or traffic load), type of data to be communicated (e.g., text, images, webpage, voice/audio, and/or video), or various combinations thereof. Values of the parameters may be specified for each access point, for example, in the database that maps the geographic regions to the public IP addresses used for network address translation. Alternatively or additionally, the values of the parameters may be retrieved from one or more other data sources including, for example, internet-connected data repositories, and/or third-party data subscription services. If the selected access point is different than the access point used to communicate the service request, the load-distribution server may prompt the endpoint to contact a selected server via the selected access point. Contacting the selected server via the selected access point causes the NAT circuit to assign the endpoint an available port of the public IP address used for NAT for the selected access point.

Resources (e.g., servers, data paths, and/or access points) used to provide a requested service to an endpoint for routing data via public and/or private networks may be selected using various processes. In some embodiments, resources may be selected according to a selection algorithm specified in a configuration settings file. The configuration settings file may be stored locally or in a remote database. The selection algorithm may select resources based on various criteria including geographic region of the endpoints, transmission characteristics in the public and/or private networks (e.g., bandwidth, latency, dropped data packets, and/or BER), traffic load of available access points and/or servers, date, time, or various combinations thereof. The selection algorithm may select resources to improve various operating parameters. For example, resources may be selected to reduce latency by circumventing delays attributable to longer and/or congested data paths on the public and/or private networks, balance load between network resources, and/or improve routing efficiency on geographically diverse private networks.

In some implementations, the algorithms/criteria for selection of resources may be implemented using one or more machine learning algorithms (e.g., an evolutionary algorithm). The machine learning algorithm may be evaluated and adjusted in a training process to improve performance and/or accuracy of the algorithm. Training may include supervised or unsupervised learning. In some embodiments, a settings selection algorithm may be adjusted to use a different weighting of parameters on a trial basis. If the modified settings selection algorithm improves performance in the network(s), the modified settings selection algorithm may replace the current settings selection algorithm. Otherwise, the modified settings selection algorithm may be discarded.

The disclosed embodiments may be adapted to facilitate location-based routing for various types of communication of various types of data. While embodiments are not so limited, for ease of explanation, the examples are primarily described with reference to servers configured to provide VoIP services for endpoints.

In some embodiments, the region-based NAT circuit may include a processing circuit configured to determine data metrics for data routed between the public and private network for each of the geographic regions. The data metrics may be determined, for example, by generating various statistics relating to the quality of the VoIP calls including, for example, types of service provided to the endpoints, data path(s) used for routing of the data, and/or network characteristics of the data path(s) (e.g., bandwidth, latency, dropped data packets, and/or BER), or various combinations thereof. The processing circuit may be configured to generate reports indicating data metrics for individual transactions or sessions of the endpoints, or aggregate data for all activity of the endpoints.

In some embodiments, the processing circuit is configured to perform an analysis of the data metrics. For instance, the processing circuit may evaluate the generated data metrics for a parameter of interest specified in an input query. The input query may request that the processing circuit analyze the data metrics for various parameters of interest. Parameters of interest may include, for example, identifiers for specific ones of the data metrics and/or criteria for identifying subsets of the data metrics. As an illustrative example, an input query may request that the processing circuit filter data metrics to identify metrics common to transactions and/or sessions having a determined quality that is below a threshold specified in the query. After identifying the common metrics, the values may be used as a signature to identify similar calls as they occur. This process may be useful, for example, to determine a signature for detection of data paths that are congested.

As yet another example parameter of interest, the input query may request that a processing circuit identify data metrics that are exhibiting a recent trend in comparison to a historical average value. Trends may be identified, for instance, based on deviation of a value of the data metric in a recent time window from an average calculated from the previous time window. In some implementations, the analysis process may further evaluate identified trends to identify other metrics that exhibit a strong correlation with the identified trend. In some embodiments, a processing circuit is configured to correlate data metrics with data provided from other sources to facilitate further analysis. Other data sources may include, for example, applications utilized by the end-users in the network, internet-connected data repositories, and/or third-party data subscription services. As one example, a presence (or activity) detection circuit may provide data indicating statuses of the end-users to the processing circuit.

In some implementations, the processing circuit may be configured to provide alert messages to one or more users in response to the data metrics or analysis satisfying a set of alert criteria. For example, in some embodiments, the second processing circuit is configured to provide alert messages to one or more users in response to geographic regions becoming unbalanced. For instance, an alert may be provided to a network administrator if the number of users in the defined geographic regions becomes unbalanced. In response, the network administrator may redefine the geographic regions, for example, to divide a large geographic region into multiple smaller geographic regions. An alert may be provided if data metrics indicate that a network resource (e.g., an access point) may be non-functional.

In some embodiments, the processing circuit may additionally or alternatively be configured to provide a graphical user interface (GUI), e.g., a webpage interface, including a mechanism (e.g., button(s), selection menu(s), and/or slider(s)) for the user of the device to define/adjust geographic regions in a private network, an algorithm/criteria for automated assignment of devices to geographic regions and/or mapping geographic regions to the public IP addresses, an algorithm/criteria for selecting communication paths or routing data, and/or criteria for generating alerts.

For ease of explanation, the examples are primarily described with reference to selecting resources when service is initially requested by an endpoint in a private network. However, the embodiments are not so limited. For example, in some implementations, resources may be dynamically selected and/or adjusted while providing service to an endpoint. For instance, a selected server may be configured to monitor various parameters while providing the service to the endpoint. The monitored parameters may include, for example, geographic location of portable endpoints (e.g., wireless connected endpoints) in the private network, transmission characteristics of the data paths in the public and private networks (e.g., bandwidth, latency, dropped data packets, BER), traffic load of the access point and/or servers, type of data to be communicated (e.g., text, images, webpage, voice/audio, and/or video) or various combinations thereof. Responsive to the monitored parameters, the server may select different resources to continue providing service for the endpoint.

Turning now to the drawings, FIG. 1A shows a communication network configured in accordance with one or more embodiments for communicatively coupling a private network 150 with a plurality of data servers (e.g., VoIP servers) 110 and 114 connected in a public network 120 (e.g., the internet). The data servers are configured to provide telephony/communications services (such as a telecommunications-providing server for providing VoIP telephony services as exemplified by 8×8, Inc.) to endpoints connected via one or more networks. Processing circuitry, connected to the private network and the public network, is used to facilitate communications initiated by associated endpoints by providing an assigned mapping through which a first set of respective IP addresses in the private network is associated with the second set of IP addresses. For example, the assigned mapping includes identification of a local line having an identifier among the second set of respective IP addresses. In this context, if the call-initiating endpoint has an IP address associated with the private network's first set of respective IP addresses, the endpoint would be calling the local line associated with the second set of respective IP addresses. In response to the processing circuitry receiving a data packet (e.g., received at a first port of the telecommunications-providing server), the processing circuitry uses the data packet to identifies information about the call, such as calling/called endpoints in the private network, and the data packet is used to determine whether the endpoint identified by the first IP address indicates that the local line should be accessed (e.g., as may be imperative in a situation for contacting a fixed-line emergency-service provider) and, as may be appropriate in a NAT-based environment, also to determine in which of the geographic regions the endpoint identified by the first IP address is located.

The private network 150 is connected to the public network 120 by a region-based IP-address-mapping circuit 130 (such as via NAT). The private network 150 includes a plurality of end-points 180, 182, 184, 186, 188, 190, 192, and 194 distributed across a plurality of geographic regions 170, 172, 174, and 176. The private network 150 includes a set of access points 160 or 162. Each access point communicatively couples endpoint devices in one or more of the geographic regions 170, 172, 174, and 176 to the public network 120. In this example, the private network includes two access points. In this example, the endpoints in the private network 150 are connected to the public network 120 via multiple access points. For instance, endpoint devices in each of the geographic regions 170, 172, 174, and 176 are connected to each of the access points 160 and 162 either directly or indirectly via the other access point. Various embodiments may include more or fewer access points.

The region-based NAT circuit 130 is configured to perform region-based NAT using an exclusive subset of public IP addresses for each respective one of the geographic regions 170, 172, 174, and 176. In this example, the region-based NAT circuit 130 includes a WAN-side network interface circuit 132 configured to communicate data over a public network (e.g., the internet 120) using a set of public IP addresses. The region-based NAT circuit 130 includes a LAN-side network interface circuit 136 configured to communicate data over the private network 150 using a set of private IP addresses. A NAT processing circuit 134 performs NAT on data packets communicated between the network interface circuits 132 and 136 using a different subset of public IP addresses for each of the geographic regions 170, 172, 174, and 176.

By performing NAT using different public IP addresses for different ones of the geographic regions 170, 172, 174, and 176, geographic regions of the endpoints in the private network 150 may be determined by WAN-side devices based on the public IP address used for NAT. As an illustrative example, one or more servers 110 and 114 connected in the public network 120 may determine a geographic region of an endpoint in the private network 150 in response to receiving a connection request data packet from the endpoint. The server (e.g., 110) may determine the geographic region of an endpoint, for example, by looking up a source IP address of the received data packet in a database 112. The database maps the public IP addresses used for NAT to geographic regions 170, 172, 174, and 176 in the private network 150.

In some embodiments, the one or more of the servers 110 and 114 is configured to perform location-based routing using the geographic region determined for the endpoint. For example, after determining the geographic region of the endpoint requesting service, a server (e.g., 110) may select various resources to provide the requested service to the endpoint based on the determined geographic region. In some embodiments, resources are selected by one of the servers available for providing the requested service to the endpoint. Alternatively or additionally, the resources may be selected by a separate server (e.g., a load-distribution server or a DNS).

As previously described, selection of resources may select one of the servers 110 and 114 to provide service to the endpoint, network paths for communicating data to the endpoint, various private network node (e.g., access points 160 and 162), communication settings (transmission protocols, encryption, forward error correction, and/or audio or video codec), or various combinations thereof. The resources may be selected based on the determined geographic region of the requesting endpoint, geographic location of the access point(s) 160 and 162 and/or server(s), 110 and 114, transmission characteristics of the data paths in the public and private networks (e.g., bandwidth, latency, dropped data packets, BER), traffic load of the access point and/or servers, the type of data to be communicated (e.g., text, images, webpage, voice/audio, and/or video), or various combinations thereof.

As an illustrative example, a VoIP service provider may include a plurality of geographically distributed VoIP servers 110 and 114 (e.g., SIP and/or media relay servers) for routing of VoIP calls. When a VoIP server (e.g., 110) receives a service request (e.g., endpoint registration and/or connection request) from a private network endpoint, the VoIP server can determine the geographic region of the registering/calling endpoint (or "callee" endpoint). Using the geographic regions, the VoIP server 110 can select one of the available VoIP servers 110 and 114 to provide VoIP service for the endpoint, select data paths (e.g., telephone and/or data carriers), and/or select various other resources for connecting to the endpoint as previously described.

For the above-described embodiments and those following, unless otherwise indicated, the above-referenced ATB circuit can be implemented as needed for the embodiment/application as appropriate. As examples and depending on the embodiments/applications, such an ATB circuit is implemented using, or includes or refers to, any of various types of gateway circuits configured to provide a communication connection between a private/public network and one or more analog lines such as a fixed/land line or other line requiring an analog connection. In connection with the contexts illustrated herein, for example, each geographic regions 170, 172, 174, and 176 can include an analog telephone adapter (ATA) connected to one or more local lines. Examples of such ATB circuit including an ATB implemented on/at an endpoint of the private network, using the ATB circuit as a conventional stand-alone ATA, or by so configuring a private-branch-exchange (PBX) circuitry which directly connects to the analog line or indirectly connects to the analog line through integrated circuitry acting similar to an ATA. As another example, the ATB circuit can be implemented using a primary rate interface (PRI) circuitry. In such contexts, the ATB circuit can connect to a local line via calls redirected as described above between the private and public networks, as applicable for needs such as defined by specific emergency-service providers and/or endpoints that are not part of the private network (e.g., local or toll free telephone numbers). In a more specific embodiment in which the ATB circuit is an ATA that connects to a local line, the ATA is responsive to and/or uses control data for connecting to the local line includes and may require obtaining a dial tone using the local line. In other embodiments in which the ATB circuit does not include an ATA, similar operations would be carried out using a related communications circuit controlled by one of the (VoIP-enabled) servers, whereby the communication circuit responds to the control data by connecting to the local (analog) line whether a dedicated local line or to any combination of one or more land lines.

As a specific example, a user using an endpoint within the private network may call an emergency service provider, such as the local police (e.g., 911 in the United States, 999 and/or 112 in the United Kingdom). Assume a local branch is located in the United Kingdom and the telephone extension for the local branch is 209X (e.g., 2095, 2096). When a user dials 112 to call the police, the ATB circuit is enabled. The ATB circuit has a local line connected to it, such as a local dedicated line and/or a PRI line, and is used to automatically dial 112 on the public network and bridges the call. The address registered is the address of the local line and the emergency call is directed properly using the ATB circuit. Each branch of the private network can correspond with a geographic location. The emergency service provider (e.g., 112) has a 112 extension locally, and globally, the extension is unique so that the calls are correctly routed (e.g., 432112, 433112, 434112). A user at the particular branch can dial 112 (or 911), and the system identifies the correct branch and routes the call via the identification (e.g., 432112).

As another specific example, a user using an endpoint within the private network calls a local telephone number and/or a toll-free telephone number. A digit can be used as an extension number provided to the ATB circuit with connectivity to the public network. For example, the user may dial an 8 to enable the ATB circuit. In response to dialing the 8 on the endpoint and the ATB being enabled, the ATB opens the local line and the rest of the digits dialed by the user are passed through the local line (e.g., as a dual tone multi frequency (DTMF)). Accordingly, the local line dials the remaining numbers. For example, if a user dials 818001231234 on an endpoint with the private network, the ATB is enabled and, using the local line, the number 1-800-123-1234 is dialed. The digit (e.g., 8) can appear as a prefix to dial local or toll free numbers from within the private network. After the digit is dialed, no waiting occurs as the ATB circuit is activated and the remaining digits are passed quickly by the ATB circuit via the local line to call the local or toll free number.

An endpoint that is part of the local branch can utilize the ATB circuit from a variety of geographic locations. As a specific example, the endpoint can include a cellphone and/or other mobile device that can be utilized to make telephone calls. Regardless of the locations that the endpoint is at, the user can connect to another endpoint within a public network via the ATB circuit. For example, the user dials the number (e.g., 911 or other emergency number and/or a local or toll free number starting with a digit) and the call is connected to the endpoint of the public network utilizing the ATB circuit with the local line connection in that local branch. Specifically, the cellphone application 169 provides data to a cloud system, the cloud system provides data to the ATB circuit via a NAT circuit, and the ATB circuit directs a call to the endpoint with the public network via a local line connected to the ATB circuit.

Figure 1B:
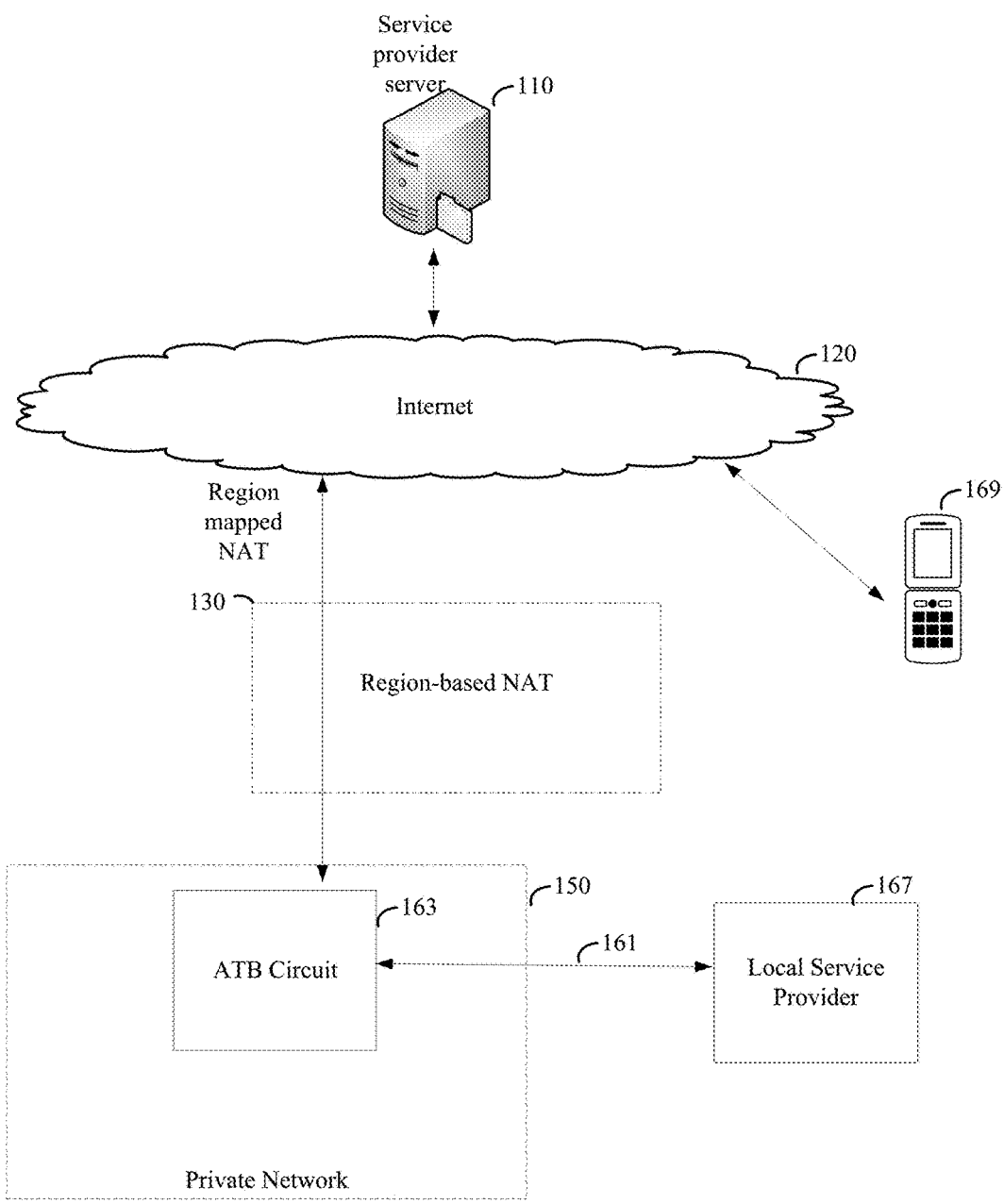

FIG. 1B shows a communication network, configured in accordance with one or more embodiments. The communication network, as illustrated by FIG. 1B, can include the same or different network as illustrated by FIG. 1A in various embodiments. For example, FIG. 1B can include an illustration of one geographic region of the system of FIG. 1A. As illustrated by FIG. 1A, the private network 150 includes an ATB circuit 163 that is connected to a local line 161. However, embodiments can include systems having a plurality of geographic regions, each geographic region including an ATB circuit connected to a local line.

As previously discussed in connection with FIG. 1A, the ATB circuit 163 is used to connect the private network 150 to a public network. For example, the ATB circuit 163 connects a VoIP call from the private network 150 to the public network via the local line 161. The local line 161 can be used to connect to a local service provider 167. For example, the local service provider 167 can be associated with a telephone number that is connected to by the ATB circuit 163 via the local line 161. Example local service providers can include venders, customers, and/or other service providers with a local or toll-free number. In various embodiments, example local service providers include emergency providers, such as the police, fire department, and/or a local emergency number (e.g., 911). In specific embodiments, the ATB circuit 163 can couple and connect simultaneous calls. For example, the ATB circuit 163 can be coupled to one local line, such as a dedicated land line, or a plurality of a land lines.

The ATB circuit 163 can connect endpoints in the private network 150 to the public network by redirecting a VoIP call to the public network. The private network 150 can include a plurality of endpoints and the public network can include a plurality of endpoints In specific embodiments, the private network 150 can include a plurality of access points, as described in connections with FIG. 1A, for communicating data between the private network 150 and the public network. Each access point can use at least one IP address of each of the subsets exclusively for NAT of data communicated between the access points. The endpoints in the private network 150 have a first set of respective IP addresses and the endpoints the public network have a second set of IP address.

A processing circuit connected to the private network and the public network performs the communication by providing an assigned mapping through which the first set of respective IP addresses in the private network is associated with the second set of IP addresses. The processing circuit can include or be incorporated as part of the telecommunications-providing server 110. The communications between the private network 150 and public network are enabled for address mapping or translation (such as NAT) in communications by the endpoints in one or more geographic regions via the mapping. For example, the assigned mapping includes identification of a local line 161, which is connected to an ATB circuit 163 associated with the respective geographic region. The local line 161 has an identifier among the second set of respective IP addresses.

In various embodiments, the mapping is based on determined geographic regions of the endpoints in the private network 150. For example, geographic locations of the plurality of endpoints in the private network 150 can be determined and the endpoints can be segmented into geographic regions based on the determined geographic locations. A data mapping of each respective geographic region to a subset of the first IP addresses assigned to the endpoints located within the respective geographic region is stored in a database, such as by the telecommunications-providing server 110.

The system can be used to direct telecommunication calls via data packets received by the telecommunications-providing server 110. The telecommunications-providing server 110 can be part of a VoIP PRI Gateway that uses a variable extension protocol to enable direct routing of calls between endpoints via the private and the public networks. In response to a data packet received at a first port of a telecommunications-providing server 110 and having a first IP address of the first set of IP addresses (e.g., identifying an endpoint in the private network), the data packet is used to determine a geographic region that the endpoint identified by the first IP address is located. Further, the data packet is used to determine whether a local line 167 should be accessed for the requested call.

The data packet received at the first port can include data identifying the other endpoint (e.g., the receiving endpoint) that the endpoint is attempting to call. For example, the data packet can include an extension that identifies the other endpoint or corresponds to information for connecting over the local line 167 through the ATB circuit 163. The telecommunications-providing server 110 can use a variable extension protocol to interpret whether the subset of the data packet received at the first port either corresponds to an extension identifying another endpoint in the private network or in the public network. Specifically, the variable extension protocol can be used to interpret whether the subset of the data packet received at the first port either corresponds to an extension identifying another endpoint or corresponds to information for connecting over the local line 167. Alternatively and/or in addition, the variable extension protocol can be used to interpret and identify which of a plurality of different extensions in a branch office (e.g., a geographic region) is targeted by the data packet at the first port. For example, the telecommunications-providing server 110 can use the variable extension protocol to interpret whether the subset of the data pack either corresponds to the extension that identifies the other endpoint device or corresponds to information for connecting over the local line through the ATB circuit and is used to further interpret and identify which of a plurality of different extensions in the branch office is targeted by the data packet received at the first port.

In response to the endpoint identified by the first IP address indicating that the local line 167 should be accessed, the ATB circuit 163 is activated. The indication that the local line 167 should be accessed can include the call number for the VoIP call including an emergency service provider number (e.g., 911) and/or a digit indicating a local telephone number or toll free-number (e.g., an "8" before the telephone number of seven digits, ten digits, or eleven digits, such as 8-123-1234, 8-123-123-1234, and 8-1-800-123-1234). As described above, the ATB circuit 163 can thereby redirect and connect to an emergency line which is specific to the geographic region and assigned for emergency calls of certain type and that are initiated on behalf of the private network.

The ATB circuit 163 can be activated by the control data. For example, the telecommunications-providing server 110 and/or the region-based NAT 130 can send the control data to the ATB circuit 163 using the identifier among the second set of respective IP addresses. The control data can be provided to directly or indirectly control the ATB activation. Examples of indirectly control include sending the first IP address, the source address, and a NAT'd data packet. In various specific embodiments, the region-based NAT is used to replace the first IP address in a source address of the received data packet with the second IP address to produce a NAT'd data packet. The NAT'd data packet is used for information (such as the control data or a portion thereof), for connecting over the local line 167 through the ATB circuit 163. The ATB circuit 163 responds to the control data by connecting to the local line 167, such as a local dedicated line and/or a PRI. In response to the activation, the call associated with the data packet received at the first port (of the telecommunications-providing server 110) is redirected to the public network by obtaining a dial tone and passing at least a subset of the data packet through the ATB circuit 163 for connecting over the local line 161.

In response to the endpoint identified by the first IP address indicating a second IP address of the first set of IP addresses (e.g., identifying another endpoint in the private network 150), another identifier among the second set of respective IP addresses is used to cause a call associated with the data packet received at the first port of the telecommunications-providing server 110 to be bridged for communications between the endpoint identified by the first IP address and an endpoint associated with the second IP address of the first set of IP addresses.

In various embodiments, an endpoint that is part of the local branch can utilize the ATB circuit 163 from a variety of geographic locations to connect to an endpoint that is part of a public network. For example, one or more endpoints of the private network 150 can include a cellphone and/or other mobile devices that can be utilized to make telephone calls. Regardless of the location that the endpoint is at, the user can connect to another endpoint within the public network via the ATB circuit 163, as previously discussed.

Figure 2:
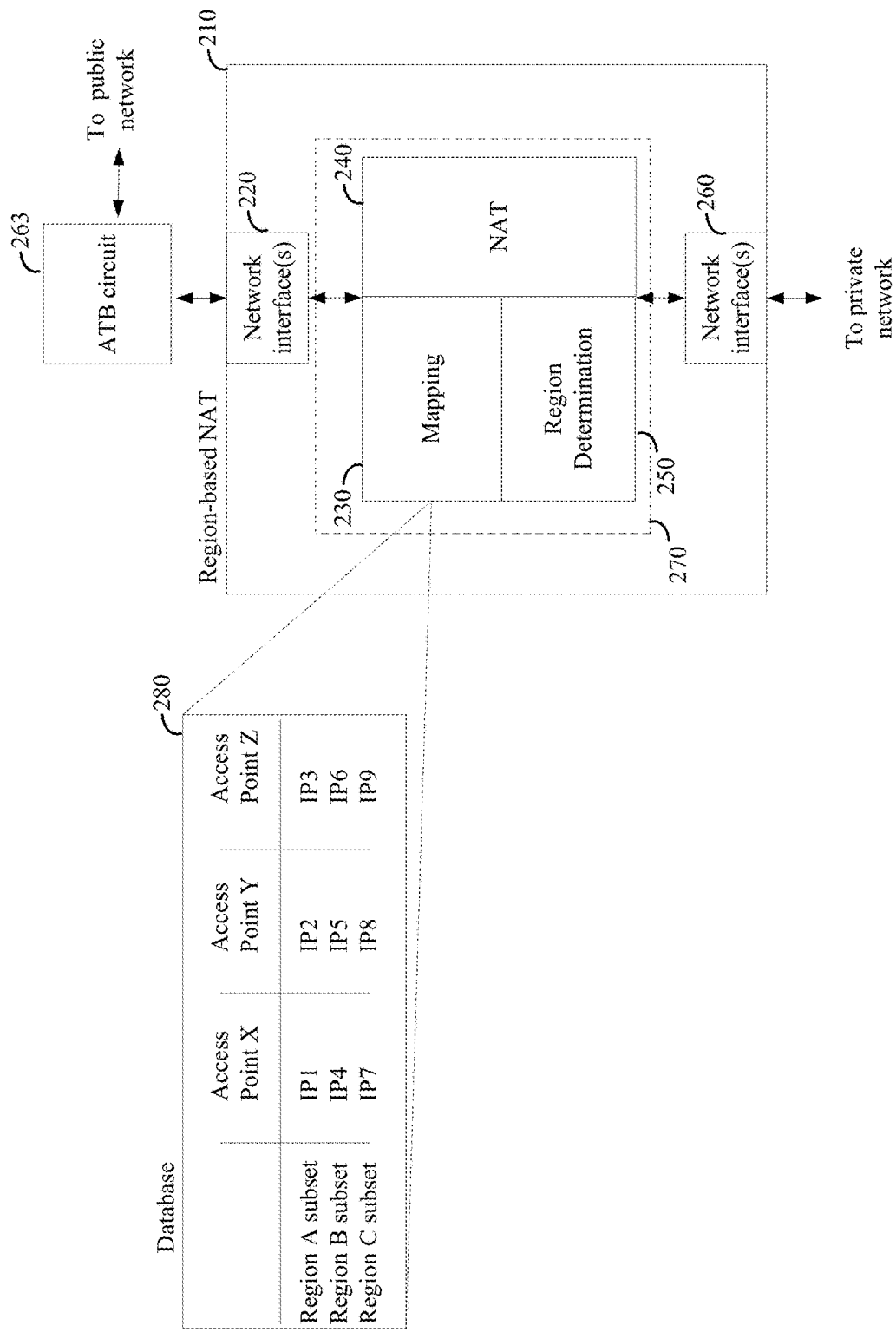
FIG. 2 shows an example circuit for performing region-based redirection and bridging of calls in accordance with one or more embodiments of the instant disclosure.

FIG. 2 shows example circuitry for performing region-based redirection and bridging of calls, in accordance with one or more embodiments. As illustrated, the circuitry includes a circuit 210 for performing region-based NAT, a database 280, and an ATB circuit 263, in accordance with one or more embodiments. The circuit 210 may be used to implement the region-based NAT circuit 130 shown in FIG. 1A. In this example, the circuit 210 includes a first network interface circuit 260 configured to communicate data over the private network using a set of private IP addresses to identify endpoints. The circuit 210 also includes a second network interface 220 and the ATB circuit 263 configured to communicate data over the public network using a set of public IP addresses to identify the endpoints.

A NAT processing circuit 270 is coupled to the first and second interfaces and configured to perform NAT, using respective subsets of the public IP addresses for plurality of geographic regions in a database 280. In this example, the NAT processing circuit 270 includes a region determination circuit 250, a mapping circuit 230, and a NAT circuit 240. The region determination circuit 250 is configured to determine a geographic region in the private network that includes the endpoint assigned to the first private IP. The geographic region may be determined, for example, by looking up the geographic region in a stored table mapping the private IP addresses to the geographic regions. In some embodiments, the table may be stored locally (e.g., in a non-volatile memory in the region determination circuit 250) or may be retrieved from a remote server communicatively connected to the circuit 210 via the public and/or private networks. The mapping circuit 230 is configured to determine the subset of public IP addresses to be used for NAT for the determined geographic region. The mapping circuit 230 may determine the subset of public IP addresses, for example, by retrieving the subset of public IP addresses from a database 280 mapping the public IP addresses to the geographic regions in the private network.

In response to receiving a data packet, via network interface 260, from a first port of a first private IP, the region determination circuit 250 determines in which of the plurality of geographic regions the endpoint identified by the first private IP address is located. The mapping circuit 230 determines a subset of the second set of IP addresses specified for the determined geographic region in the database 280. NAT circuit 270 selects a second IP address from the determined subset. The NAT circuit 270 assigns an available second port of the selected IP address for NAT. The NAT circuit 270 performs NAT for data communicated between the public and private networks via network interfaces 220 and 260 using a mapping of the first port of the first IP address to the second port of the second IP address.

As previously described, the database 280 specifies respective subsets of public IP addresses for a plurality of geographic regions in a private network. In this example, the database 280 specifies respective subsets of public IP addresses for three geographic regions A, B, and C. In some embodiments, one or more geographic regions may be subdivided into two or more sub-regions. Each sub-region may be assigned a sub-subset of the public IP addresses mapped to the region for exclusive NAT of endpoints in the sub-region. In some embodiments, each subset includes a respective sub-subset of the IP address to be used exclusively for NAT translation of data packets communicated via each of three access points (e.g., X, Y, and Z) in the private network. In some embodiments, the database 280 may specify additional information (e.g., transmission characteristics and/or capabilities) for each region and/or each access point. For each access point, the database may indicate transmission characteristics (e.g. bandwidth and/or latency) for communication between the endpoint and each of the geographic regions. The additional information may be used, for example, to select an access point used for communication between an endpoint and a selected server.

In this example, the database 280 includes a table having the subsets of IP addresses listed as table entries. Additionally or alternatively, in some embodiments, the database may specify the mapping of geographic regions and/or access points to public IP addresses as an algorithmic function. For example, for a private network having two geographic regions, odd IP addresses of the set of public IP addresses for NAT may correspond to a first geographic region of the private network. Even IP addresses of the set may correspond to a second geographic region of the private network. As a more general example, for a private network having N geographic regions, the region mapped to a public IP address used for NAT is given by:

Region=(public IP address for NAT)mod(*N*)

Other functions and/or rulesets may be used to specify the mapping of geographic regions to IP addresses. When the mapping of geographic regions to IP addresses is specified by an algorithmic function, public IP addresses used for NAT may be added or removed (according to the function) without needing to provide an updated mapping to servers in the network.

In some embodiments, the circuit 210 may be configured to implement a network connected database (e.g., 112) providing the servers in the public network (e.g., 110 and 114) access to the database 280. The servers may access the database as needed during operation to determine geographic regions of endpoints in the private network and/or other parameter data. Alternatively or additionally, a copy of the database may be stored in a remote database or at one or more of the servers (e.g., 110 and 114). In some implementations, the circuit 210 may be configured to determine and update parameter values (e.g., transmission characteristics) during operation of the public and private networks.

As previously described, the data packet received at a port of the telecommunication-communication server, which requests a VoIP call, can correspond to an extension that identifies another endpoint in the private network or an endpoint in the public network. The data packet can include data that is indicative of using a local line through the ATB circuit 263 to bridge the call. Responsive to the data packet corresponding to an extension/telephone number of another endpoint in the public network, the NAT circuit 240 can provide control data to the ATB circuit 263, which activates the ATB circuit 263. Responsive to the activation, the ATB circuit 263 connects to the local line and redirects the call to the public network.

Figure 3:
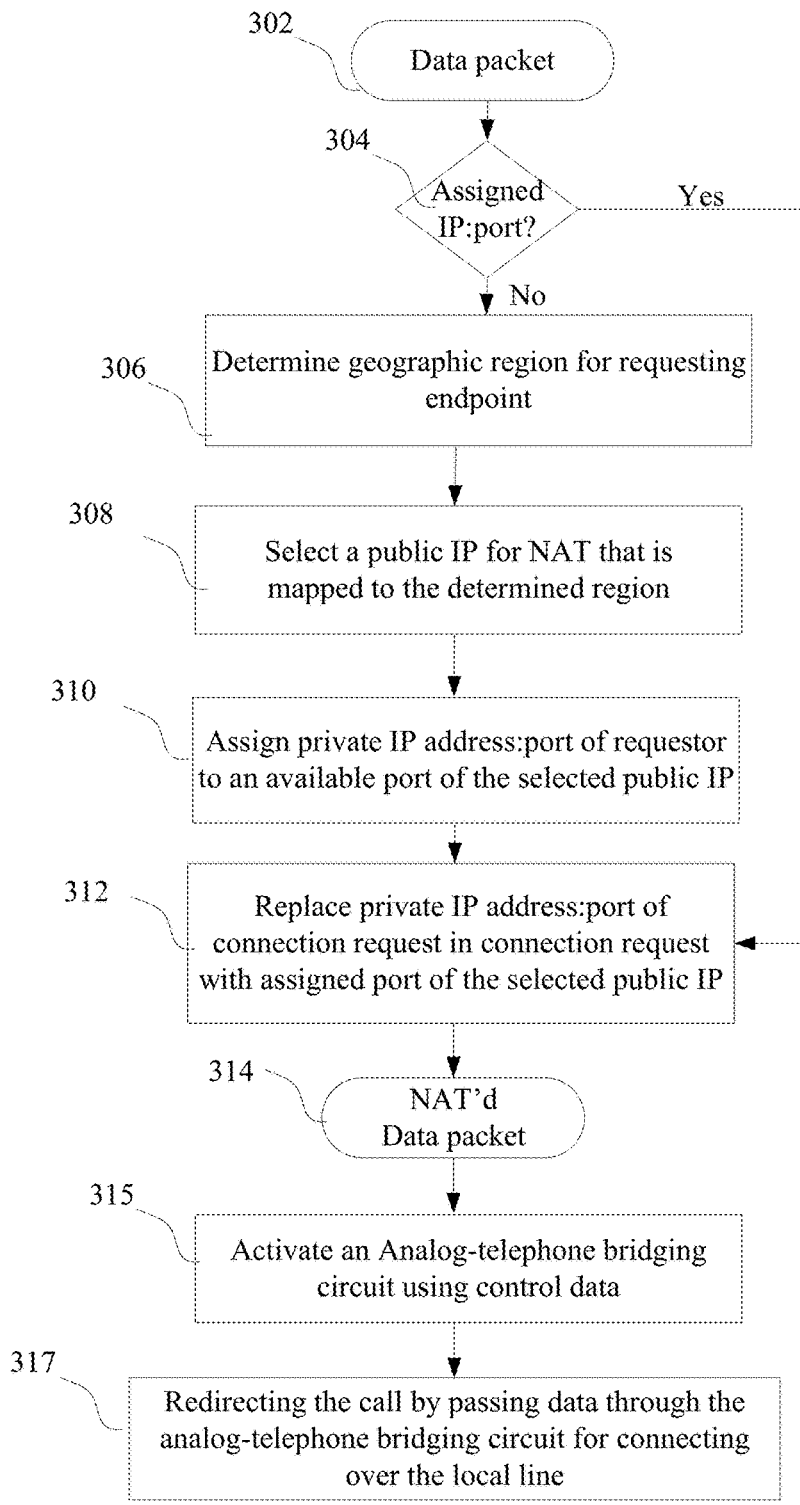
FIG. 3 shows an example process for performing region-based redirection and bridging of calls, in accordance with one or more embodiments of the instant disclosure.

FIG. 3 shows an example process for performing region-based redirection and bridging of calls, in accordance with one or more embodiments. The process may be performed, for example, by the region-based NAT 130 in FIG. 1A. The process is initiated in response to receiving an outgoing data packet 302 from an endpoint in the private network. At decision block 304, the process determines whether or not the endpoint is already assigned an IP address and port for NAT. If so, the process continues to block 312 for NAT. Otherwise, the process continues to block 306. At block 306, a geographic region of the requesting endpoint is determined. As previously described, the geographic region may be determined, for example, by looking up the geographic region in a stored table mapping the private IP addresses to the geographic regions. In some embodiments, the geographic region for a private IP may be determined according to an algorithmic function. For example, the algorithmic function may be similar to that described with reference to that may be used to indicate a mapping of geographic regions to public IP address. Alternatively or additionally, the geographic region may be determined from metadata included in the data packet. At block 308, a public IP address mapped to the determined geographic region is selected for NAT. At block 310, an available port of the selected IP address is assigned for NAT. At block 312, NAT is performed by replacing the private IP address and port in the original data packet with the selected address and assigned port, to produce a NAT'd data packet 314. For a data packet communicated from the public network to the endpoint in the private network, NAT replaces the public IP address and assigned port in the data packet with the IP address and port associated with the public IP address and assigned port at the NAT circuit.

At block 315, an ATB circuit is activated responsive to the NAT'd data packet. For example, the NAT'd data packet includes control data to activate the ATB circuit and is responsive to the data packet received (at block 302) including data that corresponds to an extension identifying an endpoint belonging to the public network or information for connecting over the local line through the ATB circuit. Response to the activation, the ATB circuit connects to the local line. The call, at block 317, is redirected by passing data through the ATB circuit for connecting over the local line as previously described.

Figure 4:
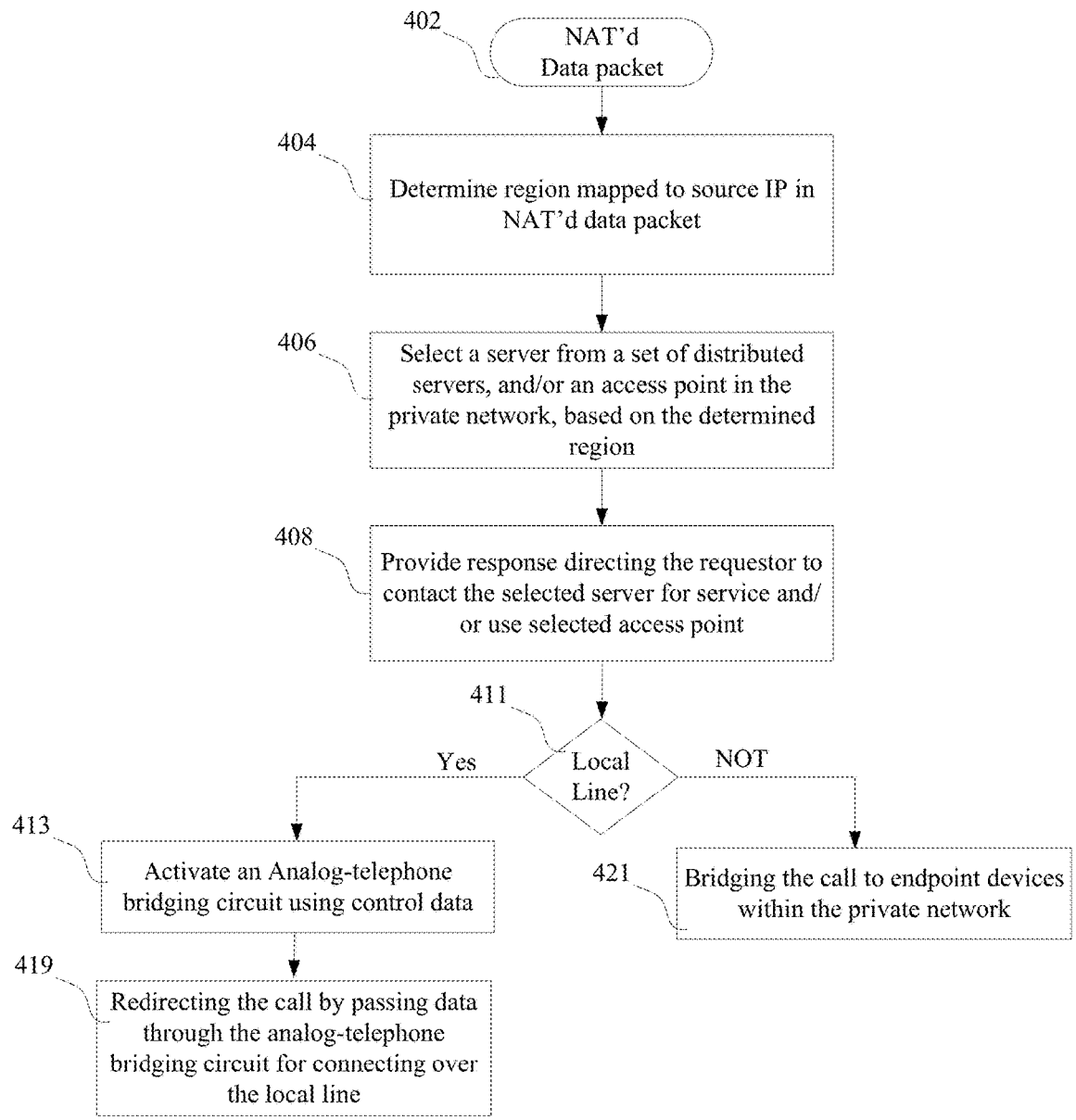
FIG. 4 shows an example process for location-based routing of data and bridging of communication calls between a private network and a local network, in accordance with one or more embodiments of the instant disclosure.

FIG. 4 shows an example process for location-based routing of data and bridging of communication calls between a private network and a local network. The process may be performed, for example, by the sever 110 in FIG. 1A. The process is initiated in response to receiving a NAT'd data packet 402 including a connection request from an endpoint in a private network (e.g., 150).

At block 404, a geographic region mapped to the NAT'd source IP in the NAT'd data packet is determined. At block 406, location-based routing is performed. In this example, a server is selected from a set of distributed servers based on the determined geographic region. Additionally or alternatively, an access point in the private network may be selected at block 406 based on the determined geographic region. At block 408, a response is provided to the source IP address and port in the NAT'd data packet 402. The response is forwarded to the endpoint by a NAT translator configured to receive data packets at the IP address. The response directs the endpoint to contact the selected server for the requested service. Alternatively or additionally, the response may direct the requesting endpoint to use the selected access point for contacting the server.

At block 411, a determination of whether a local line is to be accessed is made. For example, the telecommunication-providing server uses the data packet to determine in which of the geographic regions the endpoint identified by the first IP address is located and whether the endpoint identified by the first IP address indicates that the local line should be accessed. In response to determining that the local line should be accessed, at block 413, the ATB circuit is activated using control data. For example, an identifier (e.g., a second IP address) among the second set of IP addresses is used provide the control data to the ATB circuit. Responsive to the activated, a dial tone can be obtained using the ATB circuit and the local line. And, at block 419, the call is redirected by obtaining a dial tone and passing at least a subset of the data packet through the ATB circuit for connecting over the local line.

In response to determining the local line should not be accessed, at block 421, the call is bridged to another endpoint device in the private network. As previously discussed, the endpoint identified by the first IP address can indicate a second IP address of the first set of IP addresses corresponding to the private network. Responsive, another identifier among the second set of respective IP addresses is used to cause a call associated with the data packet received at the first port of the telecommunications-providing server to be bridged for communications between the endpoint identified by the first IP address and an endpoint associated with the second IP address of the first set of IP addresses.

Although the above figures, e.g., FIGS. 1A-4, illustrate the use of NAT for communication systems, various embodiments do not include the use of NAT. For example, in various embodiments, the telecommunications-providing server provides an assigned mapping that associates a first set of respective IP addresses in the private network with geographic locations of the respective endpoints. In some specific aspects, the assigned mapping includes identification of a local line, which can have an identifier among the second set of respective IP addresses associated with the public network. In response to a data packet received at a first port of a telecommunications-providing server having a first IP address of the first set of IP addresses, the data packet is used to determine a geographic location that the endpoint identified by the first IP address is located and whether the endpoint identified by the first IP address indicates that the local line should be accessed. In response to an indication that the local line should be accessed, the identification of the local line (e.g., an identifier among the second set of respective IP addresses) is used to cause control data to be sent for activating an ATB circuit. The call associated with the data packet received at the first port is then redirected by obtaining dial tone and passing at least a subset of the data packet through the ATB circuit for connecting over the local line. In response to the endpoint identified by the first IP address indicating a second IP address of the first set of IP addresses, such as to ID another endpoint in the private network, another identifier among the second set of respective IP addresses can be used to cause a call associated with the data packet received at the first port of the telecommunications-providing server to be bridged for communications between the endpoint identified by the first IP address and an endpoint associated with the second IP address of the first set of IP addresses.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, "circuit" and "circuitry" are understood to be overlapping/synonymous in meaning, "block" (also sometimes "logic circuitry" or "module") is circuitry or a circuit that carries out one or more of these or related operations/activities (e.g., a call control circuit). For example, in certain ones of the above-discussed embodiments, one or more modules are discrete logic circuits or programmable logic circuits configured and arranged for implementing these operations/activities, as in the blocks shown in the figures. Similarly, it will be apparent that a server (e.g., providing a corresponding software platform) includes a computer processing circuit that is configured to provide services to other circuit-based devices. Moreover, a VoIP endpoint device (or endpoint) is a communication circuit that can include processing circuits which are configured to establish VoIP communication sessions with other devices (e.g., personal computers, IP-enabled mobile phones, and tablet computers). In certain embodiments, such a processing circuit is one or more computer circuits programmed to execute a set (or sets) of instructions (and/or configuration data). The instructions (and/or configuration data) can be in the form of firmware or software stored in and accessible from a memory (circuit), where such circuits are directly associated with one or more algorithms (or processes). The activities pertaining to such algorithms are not limited to the specific flows shown in the flow charts illustrated in the figures (e.g., where a circuit is programmed to perform the related steps, functions, operations, activities, etc.). The flow charts are merely specific detailed examples. The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored instructions which may be executed by a computer (or other electronic device) to perform these operations/activities. For example, these instructions reflect activities or data flows as may be exemplified in the flow chart. As another example, where the Specification/claims may make use the generic adjectives (such as "first" and "second") to delineate, this use is not intended to connote any specific meaning/description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A method for communication between endpoints having a first set of respective IP addresses in a private network and a public network having a second set of IP addresses to identify the endpoints, the method comprising the following steps performed by at least one processing circuit connected to the private and public networks:
   providing an assigned mapping through which the first set of respective IP addresses is associated with the second set of IP addresses, and enabling communications between the private network and public network for network-address-translation (NAT) in communications by the endpoints in one or more geographic regions for which the assigned mapping includes identification of a local line having an identifier among the second set of respective IP addresses;
   in response to a data packet received at a first port of a telecommunications-providing server and having a first IP address of the first set of IP addresses, using the data packet to determine whether the endpoint identified by the first IP address indicates that the local line should be accessed;
   in response to the endpoint identified by the first IP address indicating that the local line should be accessed, using the identifier among the second set of respective IP addresses to cause control data to be sent for activating an analog-telephone bridging circuit and therefrom redirecting a call associated with the data packet received at the first port by obtaining dial tone and passing at least a subset of the data packet through the analog-telephone bridging circuit for connecting over the local line; and
   in response to the endpoint identified by the first IP address indicating a second IP address of the first set of IP addresses, using another identifier among the second set of respective IP addresses to cause a call associated with the data packet received at the first port of the telecommunications-providing server to be bridged for communications between the endpoint identified by the first IP address and an endpoint associated with the second IP address of the first set of IP addresses.

2. The method of claim 1, further including, also in response to a data packet received at a first port of a telecommunications-providing server, using the data packet to determine in which of the geographic regions the endpoint identified by the first IP address is located, wherein for each of the plurality of geographic regions, the respective mapping to the geographic region is exclusive to the geographic region, and wherein the telecommunications-providing server uses a variable extension protocol to interpret whether the data packet received at a first port is an extension identifier that identifies the other endpoint.

3. The method of claim 1, wherein the telecommunications-providing server uses a variable extension protocol to interpret whether a subset of the data packet received at a first port either corresponds to an extension that identifies the other endpoint or corresponds to information for connecting over the local line through the analog-telephone bridging circuit.

4. The method of claim 1, further including performing network address translation (NAT) by replacing the first IP address in a source address of the received data packet with the second IP address to produce a NAT'd data packet, and wherein the NAT'd data packet is used for information for connecting over the local line through the analog-telephone bridging circuit.

5. The method of claim 1, wherein the analog-telephone bridging circuit includes an analog-telephone adapter (ATA) configured and arranged to respond to the control data by connecting to the local line.

6. The method of claim 1, wherein the analog-telephone bridging circuit includes a communications circuit controlled by a server and configured and arranged to respond to the control data by connecting to the local line.

7. The method of claim 1, wherein the telecommunications-providing server uses a variable extension protocol to interpret and identify which of a plurality of different extensions in a branch office is targeted by the data packet received at a first port.

8. The method of claim 1, wherein the telecommunications-providing server uses a variable extension protocol to interpret whether a subset of the data packet received at a first port either corresponds to an extension that identifies the other endpoint or corresponds to information for connecting over the local line through the analog-telephone bridging circuit, and the variable extension protocol is used to interpret and identify which of a plurality of different extensions in a branch office is targeted by the data packet received at a first port.

9. The method of claim 1, wherein the analog-telephone bridging circuit is configured and arranged to respond to the control data by connecting to any of a plurality of land lines.

10. The method of claim 1, wherein the telecommunications-providing server is part of a VoIP PRI Gateway that uses a variable extension protocol to enable direct routing of calls between the endpoints via the private network and the public network.

11. The method of claim 1, wherein the analog-telephone bridging circuit is configured and arranged for coupling and connecting simultaneous calls.

12. The method of claim 1, wherein the analog-telephone bridging circuit is configured and arranged for coupling and connecting to an emergency line which is specific to the geographic region and assigned for emergency calls of a certain type that are initiated on behalf of the private network.

13. The method of claim 1, wherein:
   the private network includes a plurality of access points for communication of data between the private network and the public network, and further comprising, for each access point, using at least one IP address of each of the subsets exclusively for NAT of data communicated via the access point.

14. The method of claim 13, further comprising:
   determining the geographic region by determining transmission characteristics of data paths through each of a plurality of access points; and
   selecting one of the plurality of access points for communication by the endpoint based on the determined transmission characteristics.

15. The method of claim 1, further comprising:
   determining geographic locations of endpoints in the private network;
   segmenting the endpoints into the plurality of geographic regions based on the determined geographic locations; and
   storing, in a database, data mapping each respective geographic region to a subset of the first IP address assigned to the endpoints located within the respective geographic region.

16. The method of claim 1, further comprising:
mapping the data packet received at a first port of the telecommunications-providing server, based on subsets of the data packet, including one subset for indicating the geographic region and another subset for indicating whether the data packet is targeting a communication through the analog-telephone bridging circuit or targeting a communication to the other endpoint.

17. An apparatus for communicating between endpoints having a first set of respective IP addresses in a private network and a public network having a second set of IP addresses to identify the endpoints, the apparatus comprising:
a telecommunications-providing server configured and arranged to
provide an assigned mapping through which the first set of respective IP addresses is associated with the second set of IP addresses, and enable communications between the private network and public network for network-address mapping in communications by the endpoints in one or more geographic regions for which the assigned mapping includes identification of a local line having an identifier among the second set of respective IP addresses;
an analog-telephone bridging circuit configured for telephony communications in the public network and arranged in the one or more geographic regions;
the telecommunications-providing server further configured and arranged to respond to
a received data packet having a first IP address of the first set of IP addresses, by using the data packet to determine whether the endpoint identified by the first IP address indicates that the local line should be accessed,
the endpoint identified by the first IP address indicating that the local line should be accessed, by using the identifier among the second set of respective IP addresses to cause control data to be sent for activating an analog-telephone bridging circuit and therefrom redirecting a call associated with the data packet received at a first port by obtaining a dial tone and passing at least a subset of the data packet through the analog-telephone bridging circuit for connecting over the local line, and
the endpoint identified by the first IP address indicating a second IP address of the first set of IP addresses, by using another identifier among the second set of respective IP addresses to cause a call associated with the data packet received at the first port of the telecommunications-providing server to be bridged for communications between the endpoint identified by the first IP address and an endpoint associated with the second IP address of the first set of IP addresses.

18. The apparatus of claim 17, wherein the telecommunications-providing server is further configured and arranged to respond to the received data packet by using the data packet to determine in which of the geographic regions the endpoint identified by the first IP address is located, wherein for each of the plurality of geographic regions, the respective mapping to the geographic region is exclusive to the geographic region, and wherein the telecommunications-providing server uses a variable extension protocol to interpret whether the data packet received at a first port is an extension identifier that identifies the other endpoint.

19. The apparatus of claim 17, wherein the analog-telephone bridging circuit includes an analog-telephone adapter (ATA) configured and arranged to respond to the control data by connecting to the local line.

20. The apparatus of claim 17, wherein the analog-telephone bridging circuit includes a communications circuit controlled by a server and configured and arranged to respond to the control data by connecting to the local line.

21. The apparatus of claim 17, wherein the telecommunications-providing server uses a variable extension protocol to interpret and identify which of a plurality of different extensions in a branch office is targeted by the data packet received at a first port.

* * * * *